(12) United States Patent
Ha

(10) Patent No.: US 11,098,736 B2
(45) Date of Patent: Aug. 24, 2021

(54) CYLINDER HOUSING, ACTUATOR, AND CYLINDER HOUSING MANUFACTURING METHOD

(71) Applicant: Sanoh Industrial Co., Ltd., Tokyo (JP)

(72) Inventor: Huy Hung Ha, Koga (JP)

(73) Assignee: SANOH INDUSTRIAL CO., LTD., Tokyo (JP)

(*) Notice: Subject to any disclaimer, the term of this patent is extended or adjusted under 35 U.S.C. 154(b) by 551 days.

(21) Appl. No.: 16/070,761

(22) PCT Filed: Oct. 31, 2016

(86) PCT No.: PCT/JP2016/082308
§ 371 (c)(1),
(2) Date: Jul. 17, 2018

(87) PCT Pub. No.: WO2017/126183
PCT Pub. Date: Jul. 27, 2017

(65) Prior Publication Data
US 2021/0088057 A1 Mar. 25, 2021

(30) Foreign Application Priority Data
Jan. 19, 2016 (JP) .............................. JP2016-007756

(51) Int. Cl.
*F15B 15/14* (2006.01)
*B60R 21/38* (2011.01)
*F15B 15/19* (2006.01)

(52) U.S. Cl.
CPC .......... *F15B 15/1428* (2013.01); *B60R 21/38* (2013.01); *F15B 15/1438* (2013.01); *F15B 15/19* (2013.01); *F15B 2215/30* (2013.01)

(58) Field of Classification Search
CPC .............. F15B 15/1428; F15B 15/1438; F15B 2215/30; F15B 15/19; B60R 21/38; B21D 19/14; B21D 41/04
See application file for complete search history.

(56) References Cited

U.S. PATENT DOCUMENTS 3,218,927 A * 11/1965 Stott ....................... F15B 15/19
89/1.14
4,192,167 A * 3/1980 Huebner ................ B21D 41/00
72/356
(Continued)

FOREIGN PATENT DOCUMENTS

CN 103223918 A 7/2013
CN 104994970 A 10/2015
(Continued)

OTHER PUBLICATIONS

International Search Report for related PCT App No. PCT/JP2016/082308 dated Nov. 29, 2016, 2 pgs.
(Continued)

*Primary Examiner* — Thomas E Lazo
(74) *Attorney, Agent, or Firm* — Procopio, Cory, Hargreaves & Savitch LLP

(57) ABSTRACT

A cylinder housing 12 includes a cylindrical cylinder portion 21 which extends in the direction of a center axis line Z and a bent portion 22 which is bent with respect to the cylinder portion 21 and extends inward in a radial direction from an end portion of the cylinder portion 21, the cylinder portion 21 includes a first cylinder portion 25 and a second cylinder portion 26 which is located on the side of the bent portion 22 in the first cylinder portion 25 and is connected to the bent portion 22, a thickness B of the second cylinder portion 26 is equal to or larger than a thickness A of the first cylinder (Continued)

portion 25, and a thickness C of the bent portion 22 is larger than the thickness A of the first cylinder portion 25.

2 Claims, 8 Drawing Sheets

(56) References Cited

U.S. PATENT DOCUMENTS

| | | | | |
|---|---|---|---|---|
| 4,845,972 | A * | 7/1989 | Takeuchi | B21J 5/08 |
| | | | | 72/370.03 |
| 5,085,131 | A * | 2/1992 | Barrett | B21D 22/14 |
| | | | | 228/60 |
| 5,184,495 | A * | 2/1993 | Chunn | B21J 5/08 |
| | | | | 72/318 |
| 5,743,301 | A * | 4/1998 | Winship | B21C 37/16 |
| | | | | 138/109 |
| 6,851,372 | B2 * | 2/2005 | Bender | F15B 15/261 |
| | | | | 102/202.14 |
| 7,475,752 | B2 * | 1/2009 | Borg | B60R 21/38 |
| | | | | 180/274 |
| 7,698,895 | B2 * | 4/2010 | Bretfeld | F15B 15/19 |
| | | | | 60/636 |
| 8,549,975 | B2 * | 10/2013 | Schafer | B60R 21/38 |
| | | | | 89/1.14 |
| 8,635,872 | B2 * | 1/2014 | Mayer | F15B 15/19 |
| | | | | 60/632 |
| 9,470,250 | B2 * | 10/2016 | Marlin | F15B 15/1452 |
| 9,789,846 | B2 * | 10/2017 | Henck | B60R 21/38 |
| 9,956,938 | B2 * | 5/2018 | Abe | B60R 21/38 |
| 2009/0217809 | A1 | 9/2009 | Schafer et al. | |
| 2009/0223360 | A1 * | 9/2009 | Aoki | B60R 21/38 |
| | | | | 92/15 |

FOREIGN PATENT DOCUMENTS

| | | |
|---|---|---|
| DE | 2321326 A1 | 11/1973 |
| DE | 20214904 U1 | 3/2003 |
| DE | 102006031439 A1 | 1/2008 |
| EP | 1943128 B1 | 1/2013 |
| JP | S52009670 A | 1/1977 |
| JP | S54110962 A | 8/1979 |
| JP | 2006-256396 A | 9/2006 |
| JP | 2006292060 A | 10/2006 |
| JP | 2007092785 A | 4/2007 |
| JP | 2009513901 A | 4/2009 |
| JP | 2009208695 A | 9/2009 |
| JP | 2009262853 A | 11/2009 |
| JP | 2010030496 A | 2/2010 |
| JP | 2010236637 A | 10/2010 |
| JP | 2013071544 A | 4/2013 |
| JP | 56044727 A | 12/2014 |
| JP | 2015031298 A | 2/2015 |
| JP | 2015-074441 A | 4/2015 |
| KR | 10-2014-0131708 A | 11/2014 |
| KR | 10-2015-0123424 A | 11/2015 |
| WO | 2014/082666 A1 | 6/2014 |

OTHER PUBLICATIONS

Office Action for related JP App No. 2016-007756 dated Oct. 23, 2019, 3 pgs.
International Preliminary Report on Patentability for related PCT App No. PCT/JP2016/082308, dated Aug. 2, 2018, 7 pgs.
Office Action for related CN App No. 201680079191.2 dated Apr. 3, 2020, 8 pgs.

* cited by examiner

CYLINDER HOUSING, ACTUATOR, AND CYLINDER HOUSING MANUFACTURING METHOD

CROSS-REFERENCE TO RELATED APPLICATIONS

This application is a U.S. National Stage entry of PCT Application No: PCT/JP2016/082308 filed Oct. 31, 2016, which claims priority to Japanese Patent Application No. 2016-007756, filed Jan. 19, 2016, the contents of which are incorporated herein by reference.

TECHNICAL FIELD

The present invention relates to a cylinder housing of an actuator for lifting a bonnet hood in the event of a collision, an actuator including the cylinder housing, and a cylinder housing manufacturing method.

BACKGROUND ART

As a vehicle safety technology, a pop-up hood system which reduces an impact on a head of a pedestrian when colliding with the pedestrian corresponding to a protection target is known (for example, see Patent Literatures 1 and 2). The pop-up hood system includes a collision sensor which detects a collision with a pedestrian, an actuator which instantaneously lifts (pops up) a rear end portion of the bonnet hood, and an ECU which operates the actuator based on a detection result of the collision sensor. The bonnet hood is also referred to as an engine hood, an engine lid, or the like. In the description below, the bonnet hood will be simply referred to as a hood.

The actuator includes a cylinder housing, a piston portion which is accommodated in the cylinder housing to be slidable, a rod portion which extends forward in the piston portion sliding direction from the piston portion and protrudes from the cylinder housing, and an explosive which is enclosed in the cylinder housing and moves the piston portion forward in the piston portion sliding direction. Then, the ECU explodes the explosive of the actuator when the collision sensor detects a collision with a pedestrian. Then, in the actuator, the piston portion moves forward by the pressure of the gas generated by the explosion of the explosive. Then, when the rod portion extends from the cylinder housing, the rear end portion of the bonnet hood is instantaneously lifted. Accordingly, a space below the bonnet hood is widened so that an impact on a head of the pedestrian is reduced.

CITATION LIST

Patent Literature

Patent Literature 1: Japanese Unexamined Patent Publication No. 2013-071544
Patent Literature 2: Japanese Unexamined Patent Publication No. 2009-262853

SUMMARY OF INVENTION

Technical Problem

In such an actuator, a piston locking portion to which the piston portion is locked needs to be formed at the front end portion of the cylinder housing so that the piston portion is not separated from the cylinder housing. Since the piston portion which moves at a high speed by the explosion of the explosive collides with the piston locking portion, a large shear stress is applied thereto.

Here, in the actuators described in Patent Literatures 1 and 2, a cap serving as the piston locking portion is provided separately from the cylinder housing. In the actuator described in Patent Literature 1, the cap is attached to the cylinder housing by crimping. Meanwhile, in the actuator described in Patent Literature 2, the cap is attached to the cylinder housing by threading. Then, the cap is made thicker than the cylinder housing so that the cap has a strength as the piston locking portion.

However, in the actuators described in Patent Literatures 1 and 2, the cap serving as the piston locking portion is formed as a member separated from the cylinder housing. For this reason, a problem arises in that the number of components increases. Further, since the number of assembly steps for assembling the cap to the cylinder housing increases and the coaxiality of the cap with respect to the cylinder housing needs to be managed, a problem also arises in that a manufacturing cost increases.

Here, an aspect of the invention is to provide a cylinder housing capable of securing a necessary strength while decreasing a manufacturing cost, an actuator, and a cylinder housing manufacturing method.

Solution to Problem

A cylinder housing according to an aspect of the invention is a cylinder housing of an actuator for lifting a bonnet hood in the event of a collision, wherein the actuator includes the cylinder housing which is fixed to a vehicle body of a vehicle and extends in a center axis line direction, a piston portion which is accommodated in the cylinder housing to be slidable, a rod portion which extends forward in a sliding direction of the piston portion from the piston portion and protrudes from the cylinder housing, and a drive source which moves the piston portion forward in the sliding direction, wherein the cylinder housing includes a cylindrical cylinder portion which extends in the center axis line direction, and a bent portion which is bent with respect to the cylinder portion and extends inward in a radial direction from an end portion of the cylinder portion, wherein the cylinder portion includes a first cylinder portion, and a second cylinder portion which is located on the side of the bent portion in the first cylinder portion and is connected to the bent portion, wherein a thickness of the second cylinder portion is equal to or larger than a thickness of the first cylinder portion, and wherein a thickness of the bent portion is larger than the thickness of the first cylinder portion.

The cylinder housing according to an aspect of the invention includes the cylindrical cylinder portion and the bent portion which extends inward in the radial direction from the end portion of the cylinder portion. For this reason, when the drive source moves the piston portion, the piston portion moves while being guided to the cylinder portion and stops while colliding with the bent portion. That is, the bent portion serves as a piston locking portion which prevents the piston portion from being separated from the cylinder housing. Then, the bent portion is formed to be bent with respect to the cylindrical cylinder portion. That is, the bent portion is formed as a single member along with the cylinder portion. For this reason, it is possible to decrease the number of components of the actuator compared to the conventional cylinder housing in which a cap is formed as a separate member. Accordingly, it is possible to decrease a manufacturing cost. Further, a large shear stress is applied to the bent portion due to the collision of the piston portion. However, since the thickness of the bent portion is larger than the thickness of the first cylinder portion, it is possible to improve the strength of the bent portion with respect to the first cylinder portion. For this reason, it is possible to efficiently secure a necessary strength while suppressing an increase in weight compared to a case where the thickness of the entire cylinder housing is increased. Further, since the thickness of the second cylinder portion is equal to or larger than the thickness of the first cylinder portion, the strength of the cylinder portion in the second cylinder portion does not decrease locally.

The thickness of the second cylinder portion may be larger than the thickness of the first cylinder portion. When the piston portion collides with the bent portion, a large stress is generated also in the vicinity of the bent portion. Here, in the cylinder housing, since the thickness of the second cylinder portion connected to the bent portion is set to be larger than the thickness of the first cylinder portion, it is possible to efficiently and effectively suppress the deformation of the bent portion while suppressing an increase in weight compared to a case where the thickness of the entire cylinder portion is increased.

Further, the length of the second cylinder portion in the center axis line direction may be equal to or larger than the outer diameter of the second cylinder portion. It is considered that a stress generated by the collision with the bent portion in the piston portion increases to a position in which the length is substantially the same as the outer diameter of the cylinder portion from the bent portion. Here, in the cylinder housing, since the length of the second cylinder portion thicker than the first cylinder portion is equal to or larger than the outer diameter of the second cylinder portion, it is possible to further efficiently suppress the deformation of the bent portion.

An actuator according to an aspect of the invention is an actuator for lifting a bonnet hood in the event of a collision, including: any one of the above-described cylinder housings fixed to the vehicle body of the vehicle and extending in the center axis line direction; a piston portion which is accommodated in the cylinder housing to be slidable; a rod portion which extends in the center axis line direction from the piston portion and protrudes from the cylinder housing; and a drive source which moves the piston portion forward in the sliding direction.

Since the actuator according to an aspect of the invention includes any one of the above-described cylinder housings, it is possible to secure a necessary strength while decreasing a manufacturing cost.

A cylinder housing manufacturing method according to an aspect of the invention is a cylinder housing manufacturing method of an actuator for lifting a bonnet hood in the event of a collision, including: a thick portion forming step of forming a thick portion having a thickness thicker than the other portion at one end portion of a cylindrical tube extending linearly; and a bending step of bending at least a part of the thick portion inward in a radial direction.

In the cylinder housing manufacturing method according to an aspect of the invention, the thick portion is formed in the tube in the thick portion forming step and then at least a part of the thick portion is bent inward in the radial direction in the bending step. Accordingly, it is possible to manufacture the cylinder housing including the cylindrical cylinder portion extending in the center axis line direction of the cylinder housing and the bent portion bent with respect to the cylinder portion and extending inward in the radial direction from the end portion of the cylinder portion.

In the bending step, a metal core may be disposed at the radial center portion of the tube and at least a part of the thick portion may be bent inward in the radial direction so that the front end of the thick portion is pressed against the metal core. In the cylinder housing manufacturing method, since the metal core is disposed at the radial center portion of the tube, the thick portion cannot advance inward in the radial direction of the tube in relation to the metal core and is bent inward in the radial direction while being increased in thickness. Accordingly, since the thickness of the bent portion further increases, it is possible to further improve the strength of the bent portion.

Further, a hole forming step of perforating the radial center portion of the bent portion bent by the bending step may be further provided. In the cylinder housing manufacturing method, since the radial center portion of the bent portion is perforated by the hole forming step, it is possible to improve the shape accuracy of the through-hole through which the rod portion is inserted.

Advantageous Effects of Invention

According to an aspect of the invention, it is possible to secure a necessary strength while decreasing a manufacturing cost.

DESCRIPTION OF EMBODIMENTS

Figure 1:
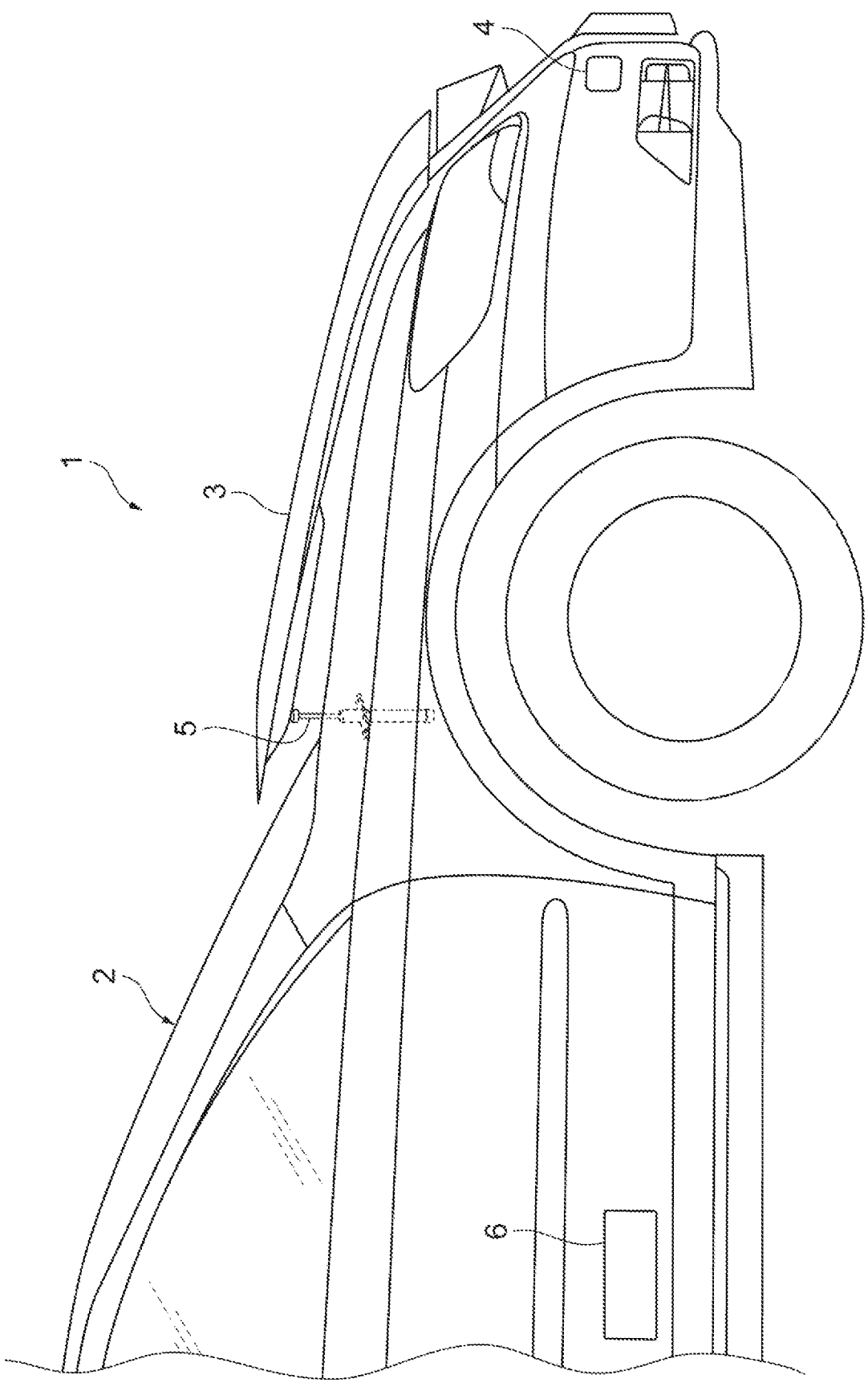
FIG. 1 is a diagram showing a state where an actuator is attached to a vehicle.

Hereinafter, an embodiment of the invention will be described with reference to the drawings. In the drawings, the same or corresponding components are denoted by the same reference numerals and a repetitive description is omitted.

FIG. 1 is a diagram showing a state where an actuator is attached to a vehicle. As shown in FIG. 1, a pop-up hood system 1 is a system that lifts a hood 3 (a bonnet hood) of a vehicle 2 in the event of a collision with a protection target such as a pedestrian. The pop-up hood system 1 includes a collision sensor 4 which detects a collision with a protection target, an actuator 5 which instantaneously lifts a rear end portion of the hood 3, and an ECU 6 which operates the actuator 5 based on a detection result of the collision sensor 4. As the collision sensor 4, for example, an acceleration sensor attached to a front bumper of the vehicle 2 can be used.

Figure 2:
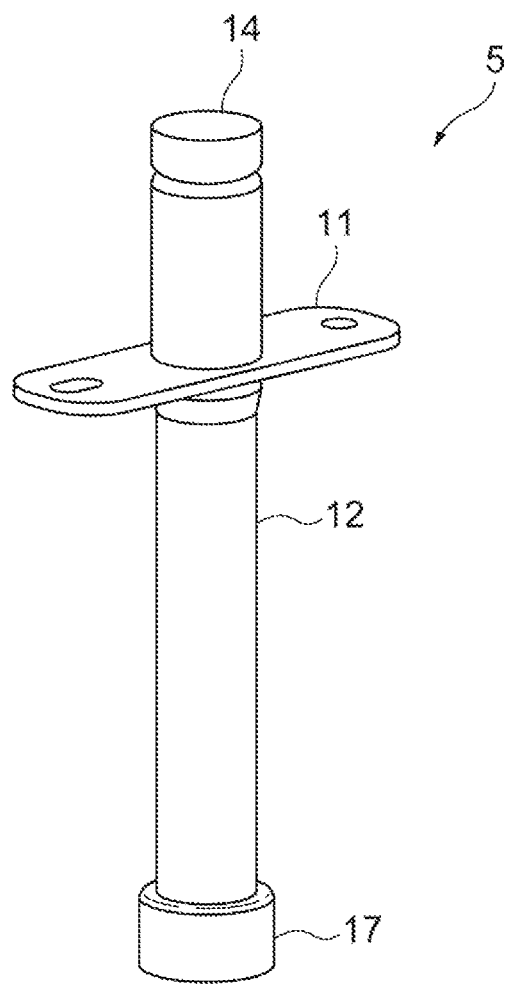
FIG. 2 is a perspective view showing the actuator.
Figure 3:
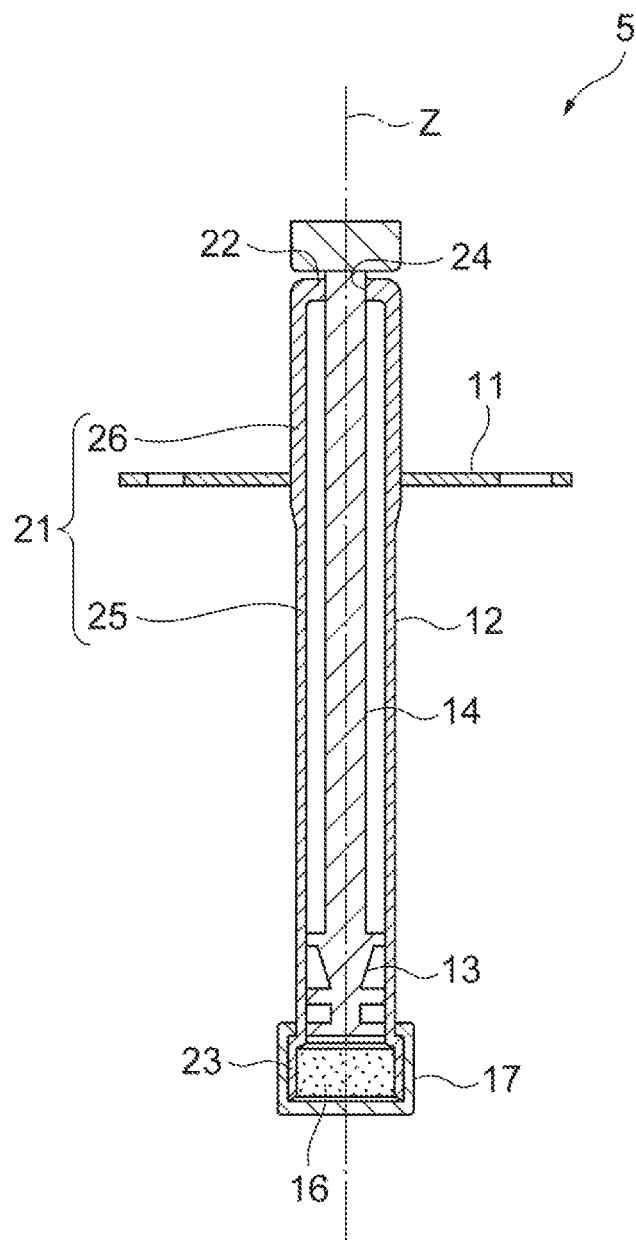
FIG. 3 is a cross-sectional view showing the actuator.
Figure 4:
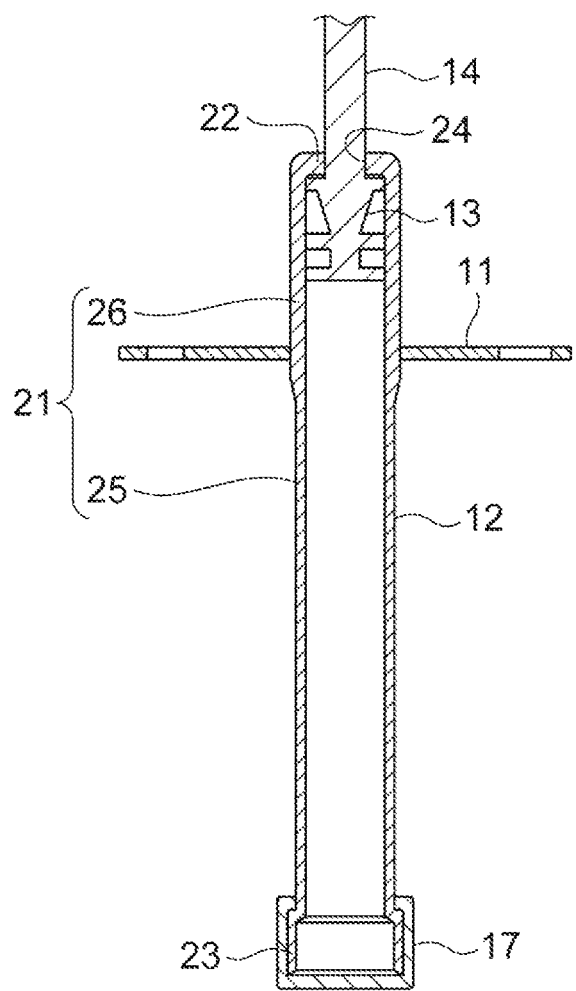
FIG. 4 is a cross-sectional view showing a state after the actuator is operated.

FIG. 2 is a perspective view showing the actuator. FIG. 3 is a cross-sectional view showing the actuator. FIG. 4 is a cross-sectional view showing a state after the actuator is operated. As shown in FIGS. 2 to 4, the actuator 5 includes a fixed plate 11 which is fixed to a vehicle body of the vehicle 2, a cylinder housing 12 which is fixed to the vehicle body of the vehicle 2 through the fixed plate 11 and extends in the direction of a center axis line Z, a piston portion 13 which is accommodated in the cylinder housing 12 to be slidable, a rod portion 14 which extends forward (upward in FIGS. 2 to 4) in the sliding direction of the piston portion 13 from the piston portion 13 and protrudes from the cylinder housing 12, and a drive source 16 which moves the piston portion 13 forward in the sliding direction of the piston portion. In this embodiment, the actuator 5 will be described as the explosive-type actuator 5 for moving the piston portion 13 by the explosion of the explosive. For this reason, the drive source 16 is a pyrotechnic and ignition device that moves the piston portion 13 by explosion. Additionally, the sliding direction of the piston portion 13 is the same as the direction of the center axis line Z of the cylinder housing 12.

The fixed plate 11 is a support member that is fixed to the cylinder housing 12 and fixes the cylinder housing 12 to the vehicle body of the vehicle 2 so that the rod portion 14 is directed toward the hood 3.

The cylinder housing 12 includes a cylindrical cylinder portion 21 which extends in the direction of the center axis line Z, a bent portion 22 which is bent with respect to the cylinder portion 21 and extends inward in the radial direction from one end portion of the cylinder portion 21, and an enlarged tube portion 23 which is enlarged in diameter at the other end portion of the cylinder portion 21 and encloses the drive source 16. That is, the cylinder portion 21, the bent portion 22, and the enlarged tube portion 23 are integrated as a single member. Specifically, the bent portion 22 is a portion which is formed by bending one end portion of the cylinder portion 21 and the enlarged tube portion 23 is a portion which is formed by enlarging the tube (enlarging the diameter) at the other end portion of the cylinder portion 21. Additionally, an enclosing member 17 for enclosing the drive source 16 is fitted to the enlarged tube portion 23.

The bent portion 22 serves as a piston locking portion which prevents the piston portion 13 from being separated from the cylinder housing 12. A through-hole 24 through which the rod portion 14 is inserted is formed at the radial center portion of the bent portion 22. Then, the piston portion 13 is inserted into the cylinder portion 21 and the rod portion 14 extending from the piston portion 13 protrudes from the cylinder housing 12 through the through-hole 24. Additionally, the front end portion of the rod portion 14 protruding from the cylinder housing 12 is enlarged in diameter to reduce an impact on the hood 3.

The ECU 6 is a control unit for controlling the operation of the actuator 5. When a collision with the protection target is detected by the collision sensor 4, the ECU 6 operates the actuator 5 by igniting the explosive of the drive source 16 with an ignition device to explode.

Specifically, in the actuator 5 which is not operated (in a normal state), as shown in FIG. 3, the piston portion 13 is disposed at the end portion on the side of the enlarged tube portion 23 of the cylinder portion 21 and the front end portion of the rod portion 14 extending from the piston portion 13 protrudes from the cylinder housing 12. Then, when the collision sensor 4 detects a collision with the protection target, the ECU 6 explodes the explosive of the drive source 16. Then, the piston portion 13 is guided to the cylinder portion 21 by the pressure of the gas generated by the explosion of the explosive so that the piston portion 13 advances toward the bent portion 22 at a high speed. In accordance with the forward movement of the piston portion 13, the rod portion 14 extends from the cylinder housing 12 toward the hood 3 at a high speed so that the rear end portion of the hood 3 is lifted instantaneously. Then, the piston portion 13 collides with the bent portion 22 so that the movement of the piston portion 13 and the rod portion 14 is stopped.

At this time, a large shear stress is applied to the bent portion 22 due to the collision with the piston portion 13. Here, in this embodiment, the thickness of the cylinder housing 12 is set as below so that the deformation of the bent portion 22 with respect to the shear stress does not increase too much.

Figure 5:
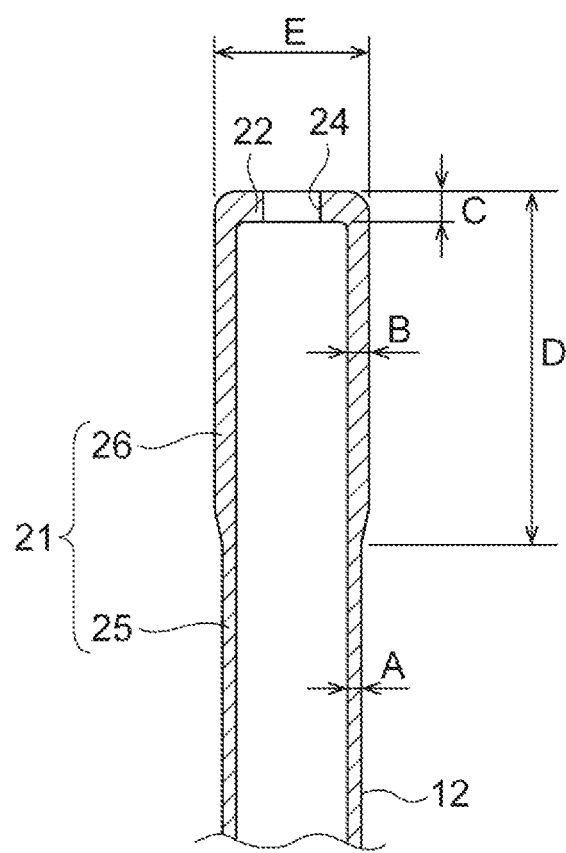
FIG. 5 is a cross-sectional view showing a part of a cylinder housing.

FIG. 5 is a cross-sectional view showing a part of the cylinder housing. As shown in FIGS. 2 to 5, the cylinder portion 21 includes a first cylinder portion 25 which is connected to the enlarged tube portion 23 and a second cylinder portion 26 which is located on the side of the bent portion 22 of the first cylinder portion 25 and is connected to the bent portion 22.

The first cylinder portion 25 has the same thickness A in the entire region in the direction of the center axis line Z. Further, the second cylinder portion 26 has the same thickness B in the entire region in the direction of the center axis line Z. Here, the meaning that the thickness is the same includes not only a case where the thickness is completely the same but also a case where the thickness is within an allowable range due to tolerance.

The thickness B of the second cylinder portion 26 is larger than the thickness A of the first cylinder portion 25. When the piston portion 13 collides with the bent portion 22, a large stress is generated also in the vicinity of the bent portion 22. Here, the thickness B of the second cylinder portion 26 is set to be larger than the thickness A of the first cylinder portion 25 so that the deformation of the bent portion 22 does not become excessive due to the deformation of the cylinder portion 21.

Specifically, the inner diameter of the second cylinder portion 26 is the same as the inner diameter of the first cylinder portion 25 and the outer diameter of the second cylinder portion 26 is larger than the outer diameter of the first cylinder portion 25. That is, the cylinder portion 21 has the same inner diameter in the entire region in the direction of the center axis line Z in order to guide the movement of the piston portion 13 on the inner peripheral surface. Here, the meaning that the inner diameter is the same includes not only a case where the thickness is completely the same but also a case where the thickness is within an allowable range due to tolerance. The inner diameter of the cylinder portion 21 is set to a dimension so that the piston portion 13 is movable with respect to the cylinder portion 21 and air tightness between the cylinder portion 21 and the piston portion 13 is maintained to some extent.

A length D of the second cylinder portion 26 in the direction of the center axis line Z is equal to or larger than an outer diameter E of the second cylinder portion 26. It is considered that a stress generated by the collision with the bent portion 22 in the piston portion 13 increases to a position in which the length is substantially the same as the outer diameter of the cylinder portion 21 from the bent portion 22. Here, the length D of the second cylinder portion 26 in the direction of the center axis line Z is set to be equal to or larger than the outer diameter E of the second cylinder portion 26 in order to efficiently suppress the deformation of the bent portion 22.

A thickness C of the bent portion 22 is larger than the thickness A of the first cylinder portion 25. As described above, a large shear stress is applied to the bent portion 22 due to the collision with the piston portion 13. Here, the thickness C of the bent portion 22 is set to be larger than the thickness A of the first cylinder portion 25 so that the deformation of the bent portion 22 does not become excessive due to the shear stress. Here, when the thickness C of the bent portion 22 is not the same in the entire radial region, the thickness C of the bent portion 22 can be set to the maximum thickness of the bent portion 22 or the thickness at a position adjacent to the cylinder portion 21. A ratio of the thickness C of the bent portion 22 with respect to the thickness A of the first cylinder portion 25 is not particularly limited. For example, the thickness C of the bent portion 22 can be set to be 1.2 times or more and further 1.5 times or more the thickness A of the first cylinder portion 25. Further, the thickness C of the bent portion 22 can be set to be 2 times or less and further 1.6 times or less the thickness A of the first cylinder portion 25.

Further, the thickness C of the bent portion 22 is equal to or larger than the thickness B of the second cylinder portion 26. When the piston portion 13 collides with the bent portion 22, a stress is generated also in the second cylinder portion 26, but a stress generated in the second cylinder portion 26 is smaller than a stress generated in the bent portion 22. Then, the reason why the piston portion 13 is separated from the cylinder housing 12 is that the influence of deformation of the bent portion 22 is larger than that of the second cylinder portion 26. Here, the thickness C of the bent portion 22 is set to be equal to or larger than the thickness B of the second cylinder portion 26 in order to efficiently prevent the piston portion 13 from being separated from the cylinder housing 12.

Next, a method of manufacturing the cylinder housing 12 will be described.

Figure 6:
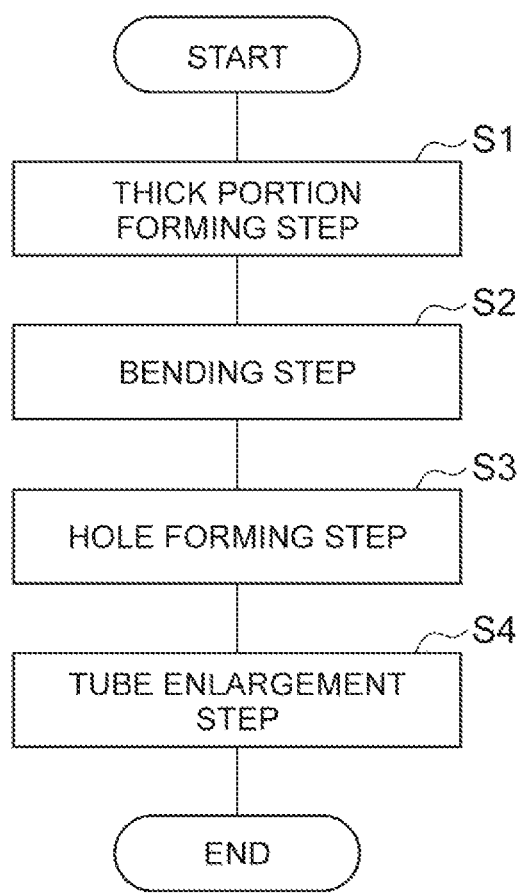
FIG. 6 is a flowchart showing a cylinder housing manufacturing method.
Figure 7:
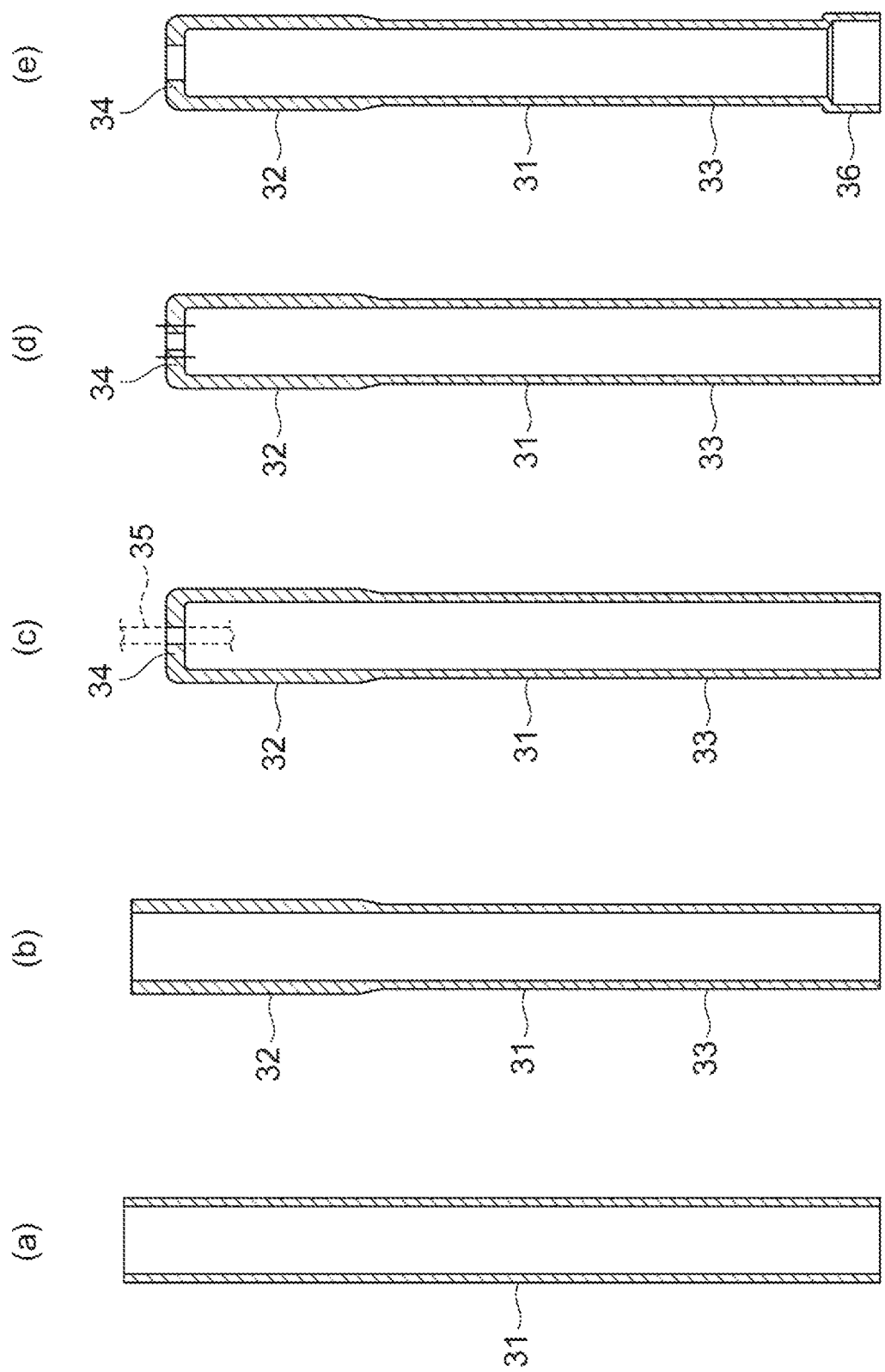
FIG. 7 is a diagram illustrating the cylinder housing manufacturing method.

FIG. 6 is a flowchart showing a cylinder housing manufacturing method. FIG. 7 is a diagram illustrating the cylinder housing manufacturing method. As shown in FIGS. 6 and 7, a cylindrical tube 31 which extends linearly is first prepared (see FIG. 7(a)). The tube 31 has the same thickness in the entire length.

Next, a thick portion forming step (S1) is performed. In the thick portion forming step, a thick portion 32 is formed at one end portion of the tube 31 to be thicker than the other portion.

Accordingly, the tube 31 is provided with a thin portion 33 having a thin thickness and the thick portion 32 having a thickness thicker than that of the thin portion 33 (see FIG. 7(b)). The thick portion 32 has the same thickness in the entire length and the thin portion 33 has the same thickness in the entire length. Additionally, a boundary between the thick portion 32 and the thin portion 33 may be Ruined as a step, but in order to reduce the concentration of the stress, the boundary may be desirably formed in a tapered shape, that is, a shape in which the thickness gradually decreases from the thick portion 32 to the thin portion 33. As a method of changing the thickness of the tube 31, various known methods can be employed. Additionally, the thin portion 33 includes the enlarged tube portion 23 and the first cylinder portion 25 of the cylinder housing 12 and the thick portion 32 includes the bent portion 22 and the second cylinder portion 26 of the cylinder housing 12.

Next, a bending step (S2) is performed. In the bending step, at least a part of the thick portion 32 is bent inward in the radial direction (see FIG. 7(c)). In this embodiment, a part of the thick portion 32 is bent inward in the radial direction. In the bending step, the thick portion 32 may be bent at one time, but may be gradually bent a plurality of times. It is desirable that the bent angle is a right angle with respect to the center axis line direction of the tube 31, but the bent angle may not be a right angle with respect to the center axis line direction of the tube 31 if a deformation caused by the collision of the piston portion 13 does not become excessive. Additionally, the bent portion 34 which is formed to be bent by the bending step in the thick portion 32 becomes the bent portion 22 of the cylinder housing 12 and a portion which is not formed to be bent by the bending step in the thick portion 32 becomes the second cylinder portion 26 of the cylinder housing 12.

Further, in the bending step, a metal core 35 is disposed at the radial center portion of the tube 31. Then, at least a part of the thick portion 32 is bent inward in the radial direction so that the front end of the thick portion 32 is pressed against the metal core 35. Then, since the thick portion 32 cannot advance inward in the radial direction of the tube 31 in relation to the metal core 35, the thick portion 32 is bent inward in the radial direction while being increased in thickness. Then, the metal core 35 is removed from the tube 31 after the bending step ends. Additionally, the hole of the thick portion 32 which is formed by the removal of the metal core 35 becomes the through-hole 24 of the cylinder housing 12.

Next, a hole forming step (S3) is performed. In the hole forming step, the radial center portion of the bent portion 34 formed to be bent by the bending step (S2) is perforated (see FIG. 7(d)). Accordingly, the shape accuracy of the through-hole 24 can be improved.

Next, a tube enlargement step (S4) is performed. In the tube enlargement step, the tube (the diameter) of the front end portion of the thin portion 33 is enlarged (see FIG. 7(e)). Additionally, an enlarged tube portion 36 in which the tube is enlarged by the tube enlargement step becomes the enlarged tube portion 23 of the cylinder housing 12.

Accordingly, the manufacturing of the cylinder housing 12 is completed.

As described above, in this embodiment, the cylindrical cylinder portion 21 and the bent portion 22 extending inward in the radial direction from the end portion of the cylinder portion 21 are provided. For this reason, when the drive source 16 moves the piston portion 13, the piston portion 13 moves while being guided to the cylinder portion 21 and then stops while colliding with the bent portion 22. That is, the bent portion 22 serves as a piston locking portion which prevents the piston portion 13 from being separated from the cylinder housing 12. Then, the bent portion 22 is formed to be bent with respect to the cylindrical cylinder portion 21. That is, the bent portion 22 is formed as a single member along with the cylinder portion 21. For this reason, it is possible to decrease the number of components of the actuator 5 compared to the conventional cylinder housing in which a cap is formed as a separate member. Accordingly, it is possible to decrease the weight and the manufacturing cost. Further, a large shear stress is applied to the bent portion 22 due to the collision with the piston portion 13. However, since the thickness C of the bent portion 22 is larger than the thickness A of the first cylinder portion 25, it is possible to improve the strength of the bent portion 22 with respect to the first cylinder portion 25. For this reason, it is possible to efficiently secure a necessary strength while suppressing an increase in weight compared to a case where the thickness of the entire cylinder housing 12 is large. Further, since the thickness B of the second cylinder portion 26 is equal to or larger than the thickness A of the first cylinder portion 25, the strength of the cylinder portion 21 in the second cylinder portion 26 does not decrease locally.

Further, since the thickness B of the second cylinder portion 26 connected to the bent portion 22 is set to be larger than the thickness A of the first cylinder portion 25, it is possible to efficiently and effectively suppress the deformation of the bent portion 22 while suppressing an increase in weight compared to a case where the thickness of the entire cylinder portion 21 is large.

Further, since the length D of the second cylinder portion 26 thicker than the first cylinder portion 25 is equal to or larger than the outer diameter E of the second cylinder portion 26, the deformation of the bent portion 22 can be further efficiently suppressed.

Further, in the method of manufacturing the cylinder housing 12, the thick portion 32 is formed in the tube 31 by the thick portion forming step (S1) and then at least a part of the thick portion 32 is bent inward in the radial direction by the bending step (S2). Accordingly, it is possible to manufacture the cylinder housing 12 including the cylindrical cylinder portion 21 which extends in the direction of the center axis line Z of the cylinder housing 12 and the bent portion 22 which is bent with respect to the cylinder portion 21 and extends inward in the radial direction from the end portion of the cylinder portion 21.

Further, since the metal core 35 is disposed at the radial center portion of the tube 31 in the bending step (S2), the thick portion 32 cannot advance inward in the radial direction of the tube 31 in relation to the metal core 35 and is bent inward in the radial direction while being increased in thickness. Accordingly, since the thickness of the bent portion 22 is further increased, the strength of the bent portion 22 can be further improved.

Further, since the radial center portion of the bent portion 22 is perforated by the hole forming step (S3), it is possible to improve the shape accuracy of the through-hole 24 through which the rod portion 14 is inserted.

Although the preferred embodiment of the invention has been described above, the invention is not limited to the above-described embodiment.

For example, in the above-described embodiment, a case has been described in which the thickness A of the first cylinder portion 25 is different from the thickness B of the second cylinder portion 26.

Figure 8:
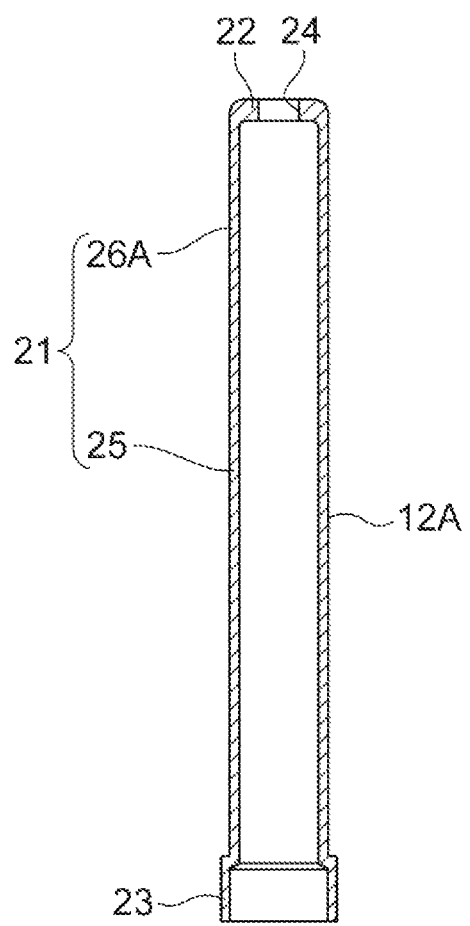
FIG. 8 is a cross-sectional view showing a modified example of the cylinder housing.

However, similarly to a cylinder housing 12A shown in FIG. 8, the thickness of the first cylinder portion 25 may be the same as that of a second cylinder portion 26A. In this case, the second cylinder portion 26A is the same as the first cylinder portion 25.

Further, in the above-described embodiment, the explosive-type actuator for moving the piston portion by the explosion of the explosive has been described. However, the configuration of the drive unit is not particularly limited and various configurations can be employed.

Further, in the above-described embodiment, a method including the hole forming step has been described as a method of manufacturing the cylinder housing 12. However, when the accuracy of forming the through-hole 24 by the metal core 35 is sufficiently high, the hole forming step may not be provided. Meanwhile, in the case of performing the hole forming step but not increasing the thickness of the thick portion 32 in the bending step, the metal core 35 may not be disposed at the radial center portion of the tube 31 in the bending step.

REFERENCE SIGNS LIST

1: pop-up hood system, 2: vehicle, 3: hood, 4: a collision sensor, 5: actuator, 6: ECU, 11: fixed plate, 12: cylinder housing, 12A: cylinder housing, 13: piston portion, 14: rod portion, 16: drive source, 17: enclosing member, 21: cylinder portion, 22: bent portion, 23: enlarged tube portion, 24: through-hole, 25: first cylinder portion, 26: second cylinder portion, 26A: second cylinder portion, 31: tube, 32: thick portion, 33: thin portion, 34: bent portion, 35: metal core, 36: enlarged tube portion, A: thickness, B: thickness, C: thickness, D: length, E: outer diameter, Z: center axis line.

The invention claimed is:

1. A cylinder housing of an actuator for lifting a bonnet hood in the event of a collision,
    wherein the actuator includes
        the cylinder housing fixed to a vehicle body of a vehicle and extending in a center axis line direction,
        a piston portion accommodated in the cylinder housing to be slidable,
        a rod portion extending forward in a sliding direction of the piston portion from the piston portion and protruding from the cylinder housing, and
        a drive source of the actuator,
    wherein the cylinder housing includes
        a cylindrical cylinder portion extending in the center axis line direction, and
        a bent portion bent with respect to the cylinder portion and extending inward in a radial direction from an end portion of the cylinder portion,
    wherein the cylinder portion includes
        a first cylinder portion, and
        a second cylinder portion which is located on the side of the bent portion in the first cylinder portion and is connected to the bent portion,
    wherein a thickness of the second cylinder portion is equal to or larger than a thickness of the first cylinder portion, and
    wherein a thickness of the bent portion is larger than the thickness of the first cylinder portion,
    wherein the thickness of the second cylinder portion is larger than the thickness of the first cylinder portion, and
    wherein a length of the second cylinder portion in the center axis line direction is equal to or larger than an outer diameter of the second cylinder portion.

2. An actuator for lifting a bonnet hood in the event of a collision, comprising:
    a cylinder housing fixed to a vehicle body of a vehicle and extending in a center axis line direction;
    a piston portion accommodated in the cylinder housing to be slidable;
    a rod portion extending forward in a sliding direction of the piston portion from the piston portion and protruding from the cylinder housing; and
    a drive source of the actuator,
    wherein the cylinder housing includes
    a cylindrical cylinder portion extending in the center axis line direction, and
    a bent portion bent with respect to the cylinder portion and extending inward in a radial direction from an end portion of the cylinder portion,
    wherein the cylinder portion includes
    a first cylinder portion, and
    a second cylinder portion which is located on the side of the bent portion in the first cylinder portion and is connected to the bent portion,
    wherein a thickness of the second cylinder portion is equal to or larger than a thickness of the first cylinder portion, and wherein a thickness of the bent portion is larger than the thickness of the first cylinder portion, wherein the thickness of the second cylinder portion is larger than the thickness of the first cylinder portion, and wherein a length of the second cylinder portion in the center axis line direction is equal to or larger than an outer diameter of the second cylinder portion.

\* \* \* \* \*